United States Patent
Eash

Patent Number: 5,848,697
Date of Patent: Dec. 15, 1998

[54] SIFTER

[76] Inventor: Lloyd F. Eash, 1130 E. State Rd. 120, Howe, Ind. 46746

[21] Appl. No.: 625,305

[22] Filed: Apr. 1, 1996

[51] Int. Cl.[6] ....................................................... B07B 1/49
[52] U.S. Cl. ............................................................ 209/419
[58] Field of Search ..................................... 209/419, 418, 209/417, 397, 392; 294/51, 55

[56] References Cited

U.S. PATENT DOCUMENTS

| 49,370 | 8/1865 | Buckland . | |
| 297,382 | 4/1884 | Golding | 209/392 X |
| 420,106 | 1/1890 | Rowland . | |
| 420,608 | 2/1890 | Rowland | 209/419 |
| 592,583 | 10/1897 | Eads . | |
| 1,094,161 | 4/1914 | Mueller | 209/419 |
| 1,237,218 | 8/1917 | Raymond | 209/419 |
| 1,646,787 | 10/1927 | Elmenthaler | 209/419 |
| 5,383,696 | 1/1995 | Speier | 209/419 X |

Primary Examiner—David H. Bollinger
Attorney, Agent, or Firm—John J. Gaydos

[57] ABSTRACT

A sifter employing a scoop formed from sheet metal provided with substantially diamond shaped apertures having inwardly extending declining walls with respect to the top surface of the scoop to facilitate separation of different size particles, such as horse manure from saw dust or wood chip particles.

7 Claims, 1 Drawing Sheet

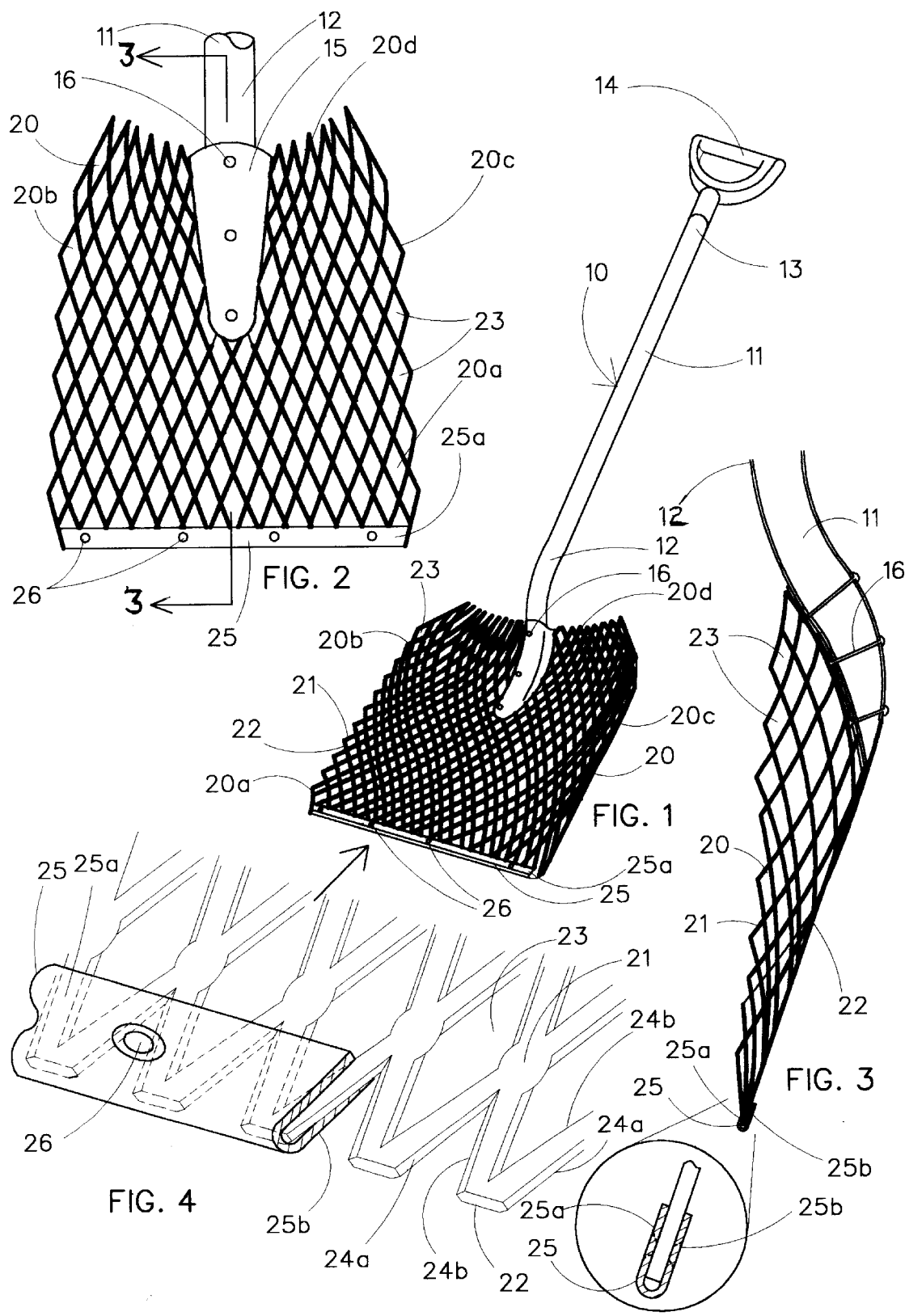

SIFTER

BACKGROUND OF THE INVENTION

The present invention relates to a sifter, and, more particularly, to an improved sifter for separating particles of different size.

The prior art is replete with one hand and two hand sifters for separating particles of different sizes. Many of the prior art sifters employ a frame defining the scoop of the sifter, and a woven wire mesh or a perforated sheet metal is secured to the frame. Tests have revealed that for certain particles, a scoop made of woven wire mesh requires more shakes to complete a sifting operation than a scoop made from perforated sheet metal. The manufacture of such prior art sifters involves substantial hand operations that are time consuming and expensive. It would, therefore, be desirable to provide a sifter for shaking particles of different size that can be manufactured in a simple and facile manner.

Other prior art sifters employ a scoop having a center cut-out portion for receiving the woven wire mesh. Sifters are frequently referred to as wire mesh sifters or perforated sifters. Prior art sifters having perforated scoops are also available on the market. Recently horse owners and trainers have changed the bedding in horse stalls from straw to saw dust and wood chip particles; however, the prior art sifters do not perform an adequate function for separating horse manure from saw dust and wood chip particles because a large number of shakes are necessary to separate the manure from the particles causing the manure to crumble and drop through the apertures provided in the scoops of the sifters. It would, therefore, be desirable to provide a sifter that is simple in construction and requires a fewer number of shakes than prior art sifters to complete the sifting operation.

OBJECTS OF THE INVENTION

Accordingly, it is an object of the present invention to provide a new and improved sifter of the character described above.

Another object of the present invention is to provide a new and improved sifter which obviates the above-described disadvantages of the prior art devices.

A further object of the present invention is to provide a new and improved sifter embodying a novel scoop containing a plurality of substantially diamond shaped apertures having declining walls that facilitates shaking of the particles.

Still another object of the present invention is to provide a new and improved sifter provided with apertures that can readily be made in various sizes and configurations to separate various size particles.

An additional object of the present invention is to provide a sifter that can be manufactured in a simple and facile manner.

An additional object of the present invention is to provide a new and improved sifter having a scoop made of aluminum that can be used outside or inside of a barn, or farmhouse any time of the year.

The invention further resides in various structural improvements and innovations made to the sifter by virtue of efficiency and simplicity of assembly combined with sturdiness, of which the structural features may be particularly mentioned, and the novel manner in which the sifter can be assembled at a low manufacturing cost.

Further objects and advantages of the present invention will become apparent as the following description proceeds, and the features of novelty characterizing the invention will be pointed out with particularity in the claims annexed to and forming a part of this specification.

BRIEF DESCRIPTION OF THE DRAWINGS

For a better understanding of the present invention, reference may be had to the accompanying drawings wherein the same reference numerals have been applied to like parts and wherein:

FIG. 1 is a prospective view of a sifter embodying the features of the present invention;

FIG. 2 is an enlarged top view of the scoop of the sifter shown in FIG. 1 of the drawings;

FIG. 3 is a sectional view of the scoop of the sifter taken along line 3—3 of FIG. 2 of the drawings and showing an enlarged front end portion; and FIG. 4 is an enlarged fragmentary isometric view of the front end portion of the ;coop shown in FIG. 2 of the drawings.

DETAILED DESCRIPTION OF THE INVENTION

In summary, to accomplish the foregoing and other objects of the present invention, there is provided a sifter for separating particles of different size generally comprising an improved scoop that requires fewer shakes than prior art sifters.

Turning now to the drawings, wherein like components are designated by like reference numerals throughout the various figures of the drawings, a sifter 10 frequently referred to as a sifting shovel, constructed in accordance with the present invention, is illustrated in FIGS. 1–4 of the drawings. The sifter 10 comprises an elongated handle 11 having a front end portion 12 and a rear end portion 13 and a scoop 20 fixedly secured to the front end portion 12 of the handle. The handle 11 of elongated cylindrical shape can be made of any material such as wood, plastic, fiberglass or metal and can be of solid or tubular construction.

Generally, a D-shaped adapter 14 is fixedly secured to the rear end portion 13 of the handle 11. It is to be understood that the sifter 10 can readily be used to sift different size particles without the adapter 34, i.e., a person using the sifter 10 can grip the rear end portion 13 of the handle without the adapter. D-shaped adapters are well known in the art and readily available in the market and, depending upon the type of material employed for the handle, are secured thereto by welding, riveting, or other suitable means.

As more particularly shown in the drawings, the scoop 20 is defined by a top surface 21 and a bottom surface 22 in spaced relationship to the top surface. Preferably and in accord with the present invention and as best seen in FIG. 4 of the drawings, the scoop 20 is made of sheet metal, preferably of aluminum, slitted, and then stretched or expanded to provide a plurality of apertures 23, the size of the apertures obviously depending upon the length of the slits. The expanded sheet metal 20 is then flattened by rolling or other suitable means well known in the art.

According to the present invention and as best seen in FIG. 4 of the drawings, each of the apertures is defined by a plurality of side walls 24a declining inwardly from the top surface of the scoop to facilitate movement of the small particles through the apertures 23 provided in the scoop. Referring now to FIG. 2 of the drawings, the scoop 20 comprises a center section, a front section 20a extending forwardly from the center section and defining a leading edge, a pair of upwardly extending side sections 20b, 20c secured to and integral with the center section of the scoop, an upwardly extending rear section 20d secured to the center section of the scoop, and means securing the front end portion 12 of the handle 11 to the scoop 20.

Although a material heavier than aluminum can be used depending upon the type of particles that are sifted, aluminum is preferred because of its light weight. After the sheet of metal is slitted and expanded to provide apertures of diamond shape, the surfaces thereof form an angle to the original plane of the sheet of metal. According to the present invention, the sheet of expanded metal must be flattened sufficiently until the top surface 21 and the bottom surface 22 are in substantial parallel relationship to each other. During the flattening process, the side walls 24a of the sheet metal defining the apertures 23 decline from the top surface 21 and the side walls 24b incline from the bottom surface 22 of the scoop 20 as best seen in FIG. 4 of the drawings. The declining walls 24a facilitate sifting of different size particles because the smaller size particles, upon engaging the declining walls 24a of the apertures 23 rapidly slide or roll downwardly toward the center of the apertures and quickly drop through the apertures 23. As best seen in FIG. 4 of the drawings, the declining walls 24a meet with the inclining walls 24b of the apertures 23 and form a knife edge.

The sheet of expanded metal after being flattened is cut to the designated configuration and then formed into the scoop 20 of the invention with the front portion 20a thereof retained in a straight line to facilitate removal of particles from a flat surface. A U-shaped scraper 25 is attached to the front portion 20a of the scoop 20 by welding the bight portions 25a, 25b of the U-shaped scraper 25 together as shown by spot welds 26.

As can be readily seen from the drawings and, in accord with the present invention, the center of the rear portion 20d of the scoop 20 is provided with a conical indentation or semi-socket for receiving the front end portion 12 of the handle 11. After the front end portion 12 of the handle 11 is inserted in the indentation and against the bottom surface 22 of the scoop, a reinforcing plate 15 is disposed over the top portion of the indentation and a plurality of rivets 16 inserted into holes provided in the plate 15 and in the front end portion 12 of the handle fixedly secure the handle 11 to the scoop 20.

Although the sifter 10 can be used to sift a large variety of particles, one particular use of the sifter is in horse barns. For years, straw has been used in stalls as bedding for horses. One of the difficulties when removing horse manure from a stall is that the straw cannot readily be separated from the manure and, inasmuch as a substantial amount of manure usually is removed with the straw, additional straw must continually be added to the stall. On the other hand, much of the sawdust and wood chip particles have in the past been discarded by dispersing the particles on a field or over large area of land. Substitution of sawdust and wood chip particles for straw in stalls for horses and stables has certain advantages and is generally preferred by horse owners and trainers, however, grain scoops must be used to remove the horse manure with the saw dust and wood chip particles. Metal mesh and perforated metal sifters of the prior art have been used with little success because a large number of shakes are necessary to separate properly the saw dust and wood chip particles from the manure. The large number of shakes also causes the horse manure to crumble and pass though the apertures. The sifter 20 of the present invention requires fewer shakes for separating horse manure from saw dust and wood chip particles; therefore, the sifter 20 is preferred over prior art sifters.

Studies have revealed that a person could remove the manure from a horse stall in less time by using the sifter of the present invention. Additionally a smaller amount of the saw dust and wood chip particles is removed with the horse manure than with a grain scoop, thereby cutting the annual cost of bedding material for a horse stall.

In view of the detailed description included above, the manufacture and assembly and use of the present invention will readily be understood by those skilled in the art and no further discussion thereof is included herewith.

While there has been shown and described a particular embodiment of the present invention, it will be apparent to those skilled in the art that various modifications may be made without departing from the invention in its broader aspects, and it is, therefore, aimed in the appended claims to cover all such changes and modifications which fall within the true spirit and scope of the present invention.

The invention claimed is:

1. A sifter for separating particles of different size comprising an elongated handle having a first end portion and a second end portion, a scoop having a top surface and a bottom surface in spaced relationship to the top surface and provided with a plurality of apertures, each of the apertures being defined by a pair of declining walls extending downwardly at an angle from the top surface of the scoop to facilitate movement of certain of the particles through the apertures provided in the scoop, the scoop comprising a center section, a front section extending forwardly from the center section and defining a leading edge, a pair of upwardly extending side sections secured to and integral with the center section of the scoop, an upwardly extending rear section secured to and integral with the center section of the scoop, and means securing the front end portion of the handle to the scoop.

2. The sifter of claim No. 1, further comprising an elongated scraper secured to the front edge of the scoop.

3. The sifter of claim No. 1, wherein the means comprises a reinforcing plate disposed on the top surface of the scoop and the front end portion of the handle is disposed in a conical indentation and against the bottom surface of the scoop.

4. The sifter of claim No. 1, wherein the scoop formed of expanded metal and flattened defines the top surface and the bottom surface of the scoop in spaced relationship.

5. The sifter of claim No. 1, comprising a D-shaped adapter secured to the rear end portion of the handle.

6. The sifter of claim No. 4, wherein the apertures are substantially diamond shaped.

7. The sifter of claim No. 6, wherein each of the apertures provided in the scoop has inclining walls extending upwardly from the bottom surface of the scoop toward the declining walls extending downwardly from the top surface of the scoop, both walls joining each other and defining a knife edge between and in substantial parallel relationship to the top surface and the bottom surface of the scoop.

* * * * *